UNITED STATES PATENT OFFICE 2,663,706

1-SUBSTITUTED-4-AMINOPIPERAZINES AND METHOD OF PREPARING THE SAME

Edward A. Conroy, Plainfield, N. J., assignor to American Cyanamid Company, New York, N. Y., a corporation of Maine No Drawing. Application June 22, 1951,
Serial No. 233,124

15 Claims. (Cl. 260—256.4)

This invention relates to new organic compounds. More particularly, it relates to 1-substituted-4-aminopiperazines and methods of preparing the same.

The compounds of the present invention may be illustrated by the following general formula:

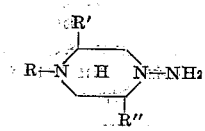

in which R is an alkyl, aryl, aralkyl, dialkylcarbamyl or nitrogen containing heterocyclic radical and R' and R'' are hydrogen or a lower alkyl radical.

In general the free amino compounds of the present invention are low melting solids, many of which are actually liquid at room temperature. They are, in general, slightly soluble in petroleum ether or petroleum benzene but readily soluble in water, lower aliphatic alcohols, chloroform and the like.

The new compounds of the present invention are preferably prepared by reacting a 1-substituted piperazine with nitrous acid to produce the 1-substituted-4-nitrosopiperazine which is subsequently reduced to give the desired 1-substituted-4-aminopiperazines.

As indicated above, the intermediates in the present invention, namely, the 1-substituted piperazines, may be those in which the substituent is an alkyl group such as methyl, ethyl, propyl, butyl, and the like, or an aryl radical such as phenyl, chlorophenyl, nitrophenyl, and the like, or an aralkyl radical such as the benzyl, phenethyl and benzhydryl radicals or a nitrogen containing heterocyclic radical such as pyridyl, pyrimidyl, pyrazinyl, thiazolyl, etc. The piperazine ring may also contain one or more lower alkyl substituents on the 2- and 5-carbon atoms thereof, such as methyl, ethyl, propyl, and the like.

Although the reduction of the 1-substituted-4-nitrosopiperazines prepared in the process of the present invention may be accomplished by catalytic means, I prefer to use a chemical method. The preferred method is reduction with an acid and a metal, for example, zinc dust and acetic acid, tin and hydrochloric acid, etc. The reduction is preferably carried out in water or lower aliphatic alcohols or mixtures of water and such alcohols at a temperature of from —10° to 30° C. Other chemical methods may be used in the reduction of the 1-substituted-4-nitrosopiperazines such as the use of lithium aluminum hydride.

The compounds of the present invention may be prepared by other methods such as the reduction of 1-substituted-4-nitropiperazines or the treatment of a 1-substituted piperazine with aminopersulfuric acid or with hydroxylamine-O-sulfonic acid.

In carrying out the reduction of the 1-substituted-4-nitrosopiperazines by the preferred method, the zinc dust is added portionwise to a stirred solution or slurry of the 1-substituted-4-nitrosopiperazine in the solvent and acetic acid. The reaction is exothermic and the reaction mixture must be cooled. During this addition it is preferable that the temperature be not allowed to rise above about 30° C. since cleavage of the N—N bond occurs to an appreciable extent above this temperature. The completion of the reaction may be determined by the discharging of the yellow color of the nitroso compound and also by the absence of a sharp rise in temperature upon the addition of each portion of zinc dust. When the reaction is completed the reaction mixture is filtered to remove excess zinc dust. The 1-substituted-4-aminopiperazines are liberated from the reaction mixture by the addition of concentrated aqueous caustic. The precipitated zinc hydroxide is redissolved as sodium zincate by the addition of sufficient excess of concentrated aqueous caustic and the product as free base is extracted with ordinary ether or chloroform. After removal of the solvent from the extract the residual product may be purified by distillation or, in some cases, by recrystallization from solvents such as petroleum ether or naphtha.

As the 1-substituted-4-aminopiperazines of the present invention are basic in character, due to the presence of an amino group, they will form stable addition salts with acids. To form a salt of the free base it is preferable to treat a solution of the base in a lower aliphatic alcohol with a solution of the acid in water or a lower aliphatic alcohol. If the acid is a gas, it may simply be bubbled through the solution of the base. In most cases the salt will precipitate from the solution and may be isolated by filtration and dried. Acids such as citric, tartaric, picric, benzoic, lactic, malic, sulfuric, sulfamic, hydrochloric, hydrobromic and the like will, in general, react with the 1-substituted-4-aminopiperazines to form salts. In general, the salts are crystalline solids, a few of which, such as the 1-diethylcarbamyl-4-aminopiperazine hydrochloride, are hygroscopic.

The 1-substituted-4-aminopiperazines of the present invention are, in effect, hydrazine compounds. Because of the known high toxicity of hydrazine, and simple substituted hydrazines, it is surprising that the compounds of the present invention are very much less toxic. Some of them possess useful physiological activity such as anticonvulsant activity in controlling convulsive seizures and at doses that are not toxic to the host. Because of their hydrazine structure the compounds of the present invention are useful as intermediates in the preparation of the compounds of my copending application, Serial Number 233,125, filed June 22, 1951 and also of a copending application of which I am coinventor with R. P. Parker, Serial Number 233,126, filed June 22, 1951.

The examples which follow illustrate the general process of the present invention for the preparation of 1-substituted-4-aminopiperazines and salts of such compounds.

EXAMPLE 1

To a solution of 100 parts of 1-(4-chlorophenyl)-piperazine in 400 parts of water is added 36% aqueous hydrochloric acid until the solution is acidic to Congo Red paper. The temperature of this solution is maintained at 70°–75° C., with stirring, while a solution of 35 parts of sodium nitrite in 50 parts of water is added dropwise over a period of one hour. The material which separates during the course of the addition is isolated. This material, 1-(4-chlorophenyl)-4-nitrosopiperazine, when crystallized from absolute ethanol, melts at 94°–95° C.

By following the above procedure and substituting for the 1-(4-chlorophenyl)piperazine an equivalent amount of the compound listed in column 1 of the table below, the corresponding 4-nitroso compound, whose properties are listed in columns 2 and 3 of the table, is obtained.

In a solution of 750 parts of glacial acetic acid and 750 parts of water is suspended 225 parts of 1-(4-chlorophenyl)-4-nitrosopiperazine. The temperature of the slurry is maintained at 25°–30° C., with stirring, while 200 parts of zinc dust is added portionwise over a period of one-half hour. Then the temperature of the reaction mixture is maintained at 50° C. for one hour. The reaction mixture is filtered and to the filtrate is added 2,300 parts of 50% aqueous sodium hydroxide solution. The product is extracted with chloroform and the solvent is removed from the extract by distillation. The residue is crystallized from petroleum benzene. The product, 1-(4-chlorophenyl)-4-aminopiperazine, melts at 87.5°–89.0° C.

TABLE

| 1-substituted piperazines | 4-Nitroso derivatives | | Remark |
|---|---|---|---|
| | M. P., °C. | B. P. | |
| 1-(2-pyridyl)piperazine | 86–87 | | |
| 1-(2-pyrimidyl)piperazine | 119–120 | | |
| 1-(2-thiazolyl)piperazine | 98–99 | | (1) |
| 1-methylpiperazine | | 118–120° C./25 mm. | (2) |
| 1-benzylpiperazine | 57–58 | 148–150° C./2 mm. | |
| 1-diethylcarbamylpiperazine | | 198–200° C./15 mm. | |

[1] The temperature of the solution is maintained at 15° C. instead of 70–75° C. for the nitrosation of this compound.
[2] This product does not separate from the solution but may be extracted with a solvent such as chloroform.

EXAMPLE 2

*1-(4-chlorophenyl)-4-aminopiperazine benzoate*

In 160 parts of absolute ethanol is dissolved 10.6 parts of 1-(4-chlorophenyl)-4-aminopiperazine and 6.1 parts of benzoic acid. The solution, on cooling, deposits white crystals of 1-(4-chlorophenyl)-4-aminopiperazine benzoate which melts at 130.5°–131.5° C.

EXAMPLE 3

*1-(2-pyridyl)-4-aminopiperazine*

In a solution of 400 parts of glacial acetic acid and 600 parts of water is dissolved 192 parts of 1-(2-pyridyl)-4-nitrosopiperazine (see the table, Example 1 above). The temperature of the solution is maintained at 25°–30° C., with stirring, while 200 parts of zinc dust is added portionwise over a period of one hour. Then the temperature of the reaction mixture is maintained at 60° C. for one-half hour. The reaction mixture is filtered and to the filtrate is added 1,500 parts of 50% aqueous sodium hydroxide solution. The product is extracted with chloroform and the solvent is removed from the extract by distillation. The residue is distilled at 15.0 mm. and the fraction boiling at 175°–180° C. is collected as product. The product, 1-(2-pyridyl)-4-aminopiperazine, when crystallized from a mixture of absolute ethanol and petroleum benzene, melts at 76°–78° C.

EXAMPLE 4

*1-(2-pyridyl)-4-aminopiperazine benzoate*

In 200 parts of absolute ethanol is dissolved 35 parts of 1-(2-pyridyl)-4-aminopiperazine and 24 parts of benzoic acid. The solution, on cooling, deposits white crystals of 1-(2-pyridyl)-4-aminopiperazine benzoate which melts at 110.0°–111.0° C.

EXAMPLE 5

*1-(2-pyrimidyl)-4-aminopiperazine*

In a solution of 385 parts of glacial acetic acid and 490 parts of water is dissolved 167 parts of 1-(2-pyrimidyl)-4-nitrosopiperazine (see the table, Example 1 above). The temperature of the solution is maintained at 25°–30° C., with stirring, while 172 parts of zinc dust is added portionwise over a period of one hour. Then the temperature of the reaction mixture is maintained at 40° C. for one-half hour. The reaction mixture is filtered and to the filtrate is added 1,500 parts of 50% aqueous sodium hydroxide solution. The product is extracted with chloroform and the solvent is removed from the extract by distillation. The residue is distilled at 1.0 mm. and the fraction boiling at 125°–130° C. is collected as the product, 1-(2-pyrimidyl)-4-aminopiperazine.

EXAMPLE 6

*1-(2-pyrimidyl)-4-aminopiperazine hydrochloride*

In 160 parts of absolute ethanol is dissolved 30 parts of 1-(2-pyrimidyl)-4-aminopiperazine and 16.5 parts of 36% aqueous hydrochloric acid. The product separates as white crystals from the solution. The product, 1-(2-pyrimidyl)-4-aminopiperazine hydrochloride, when recrystallized from absolute ethanol, melts at 215.5°–217.0° C.

EXAMPLE 7

1-methyl-4-aminopiperazine

In a solution of 400 parts of glacial acetic acid and 600 parts of water is dissolved 130 parts of 1-methyl-4-nitrosopiperazine (see the table, Example 1 above). The temperature of the solution is maintained at 25°–30° C., with stirring, while 200 parts of zinc dust is added portionwise over a period of one hour. Then the temperature of the reaction mixture is maintained at 60° C. for one-half hour. The reaction mixture is filtered and to the filtrate is added 1,500 parts of 50% aqueous sodium hydroxide solution. The product is extracted with chloroform and the solvent is removed from the extract by distillation. The residue is distilled at atmospheric pressure and the fraction boiling at 172°–175° C. is collected as the product, 1-methyl-4-aminopiperazine.

EXAMPLE 8

1-methyl-4-aminopiperazine dihydrochloride

In 360 parts of absolute ethanol is dissolved 23 parts of 1-methyl-4-aminopiperazine and 59 parts of 36% aqueous hydrochloric acid. The product separates as white crystals from the solution. The product, 1-methyl-4-aminopiperazine dihydrochloride, when recrystallized from absolute ethanol, melts at 223.0°–225.0° C.

EXAMPLE 9

1-diethylcarbamyl-4-aminopiperazine

In a solution of 300 parts of glacial acetic acid and 600 parts of water is dissolved 172 parts of 1-diethylcarbamyl-4-nitrosopiperazine (see the table, Example 1 above). The temperature of the solution is maintained at 25°–30° C., with stirring, while 200 parts of zinc dust is added portionwise over a period of one hour. Then the temperature of the reaction mixture is maintained at 60° C. for one-half hour. The reaction mixture is filtered and to the filtrate is added 1,140 parts of 50% aqueous sodium hydroxide solution. The product is extracted with chloroform and the solvent is removed from the extract by distillation. The residue is distilled at 6.0 mm. and the fraction boiling at 148°–150° C. is collected as the product, 1-diethylcarbamyl-4-aminopiperazine.

EXAMPLE 10

1-diethylcarbamyl-4-aminopiperazine picrate

In 370 parts of absolute ethanol is dissolved 20 parts of 1-diethylcarbamyl-4-aminopiperazine and 23 parts of picric acid. The product separates as yellow crystals from the solution. The product, 1-diethylcarbamyl-4-aminopiperazine picrate, when recrystallized from absolute ethanol, melts at 134.0°–135.0° C.

EXAMPLE 11

1-benzyl-4-aminopiperazine

In a solution of 500 parts of glacial acetic acid and 500 parts of water is dissolved 270 parts of 1-benzyl-4-nitrosopiperazine (see the table, Example 1 above). The temperature of the solution is maintained at 25°–30° C., with stirring, while 230 parts of zinc dust is added portionwise over a period of one hour. Then the temperature of the reaction mixture is maintained at 60° C. for one-half hour. The reaction mixture is filtered and to the filtrate is added 2,300 parts of 50% aqueous sodium hydroxide solution. The product is extracted with chloroform and the solvent is removed from the extract by distillation. The residue is distilled at 4.0 mm. and the fraction boiling at 135°–138° C. is collected as the product, 1-benzyl-4-aminopiperazine.

EXAMPLE 12

1-benzyl-4-aminopiperazine benzoate

In 80 parts of absolute ethanol is dissolved 20 parts of 1-benzyl-4-aminopiperazine and 13 parts of benzoic acid. The solution, on cooling, deposits white crystals of 1-benzyl-4-aminopiperazine benzoate which melts at 96.0°–97.0° C.

EXAMPLE 13

1-(2-thiazolyl)-4-aminopiperazine

In a solution of 100 parts of glacial acetic acid and 50 parts of water is dissolved 50 parts of 1-(2-thiazolyl)-4-nitrosopiperazine (see the table, Example 1 above). The temperature of the solution is maintained at 25°–30° C., with stirring, while 50 parts of zinc dust is added portionwise over a period of one-half hour. Then the temperature of the reaction mixture is maintained at 50° C. for one-quarter hour. The reaction mixture is filtered and to the filtrate is added 380 parts of 50% aqueous sodium hydroxide solution. The product is extracted with chloroform and the solvent is removed from the extract by distillation. The residue is distilled at 1.0 mm. and the fraction boiling at 125°–130° C. is collected as the product, 1-(2-thiazolyl)-4-aminopiperazine.

EXAMPLE 14

1-(2-thiazolyl)-4-aminopiperazine dihydrochloride

In 120 parts of absolute ethanol is dissolved 27 parts of 1-(2-thiazolyl)-4-aminopiperazine and 14 parts of 36% aqueous hydrochloric acid. The product separates as white crystals from the solution. The product, 1-(2-thiazolyl)-4-aminopiperazine dihydrochloride, when recrystallized from 95% aqueous ethanol, melts at 229°–231° C. with decomposition.

I claim:

1. Compounds of the group having the formula:

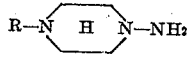

in which R is a monoacyclic aralkyl radical.

2. Compounds of the group having the formula:

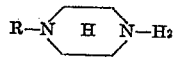

in which R is a monocyclic aryl radical.

3. 1-benzyl-4-aminopiperazine.
4. 1-(4-chlorophenyl)-4-aminopiperazine.
5. 1-(2-pyrimidyl)-4-aminopiperazine.
6. 1-methyl-4-aminopiperazine.
7. 1-diethylcarbamyl-4-aminopiperazine.
8. A method of preparing compounds having the general formula:

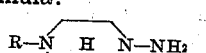

in which R is a monocyclic aralkyl radical which comprises reacting a 1-monocyclic-aralkyl-piperazine with an alkali metal nitrite and a mineral acid to produce a 1-monocyclic-aralkyl-4-nitrosopiperazine, subsequently reducing said nitrosopiperazine with a metal and an acid and recovering said 4-aminopiperazine therefrom.

9. A method of preparing compounds having the general formula:

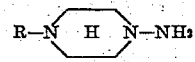

in which R is a monocyclic aryl radical which comprises reacting a 1-monocyclic arylpiperazine with an alkali metal nitrite and a mineral acid to produce a 1-monocyclic aryl-4-nitrosopiperazine, subsequently reducing said nitrosopiperazine with a metal and an acid and recovering said 4-aminopiperazine therefrom.

10. A method of preparing 1-benzyl-4-aminopiperazine which comprises the step of reducing 1-benzyl-4-nitrosopiperazine with zinc dust and acetic acid and recovering said 1-benzyl-4-aminopiperazine therefrom.

11. A method of preparing 1-(4-chlorophenyl)-4-aminopiperazine which comprises the step of reducing 1-(4-chlorophenyl)-4-nitrosopiperazine with acetic acid and zinc and recovering said 1-(4-chlorophenyl)-4-aminopiperazine therefrom.

12. A method of preparing 1-(2-pyrimidyl)-4-aminopiperazine which comprises the step of reducing 1-(2-pyrimidyl)-4-nitrosopiperazine with acetic acid and zinc and recovering said 1-(2-pyrimidyl)-4-aminopiperazine therefrom.

13. A method of preparing 1-methyl-4-aminopiperazine which comprises the step of reducing 1-methyl-4-nitrosopiperazine with acetic acid and zinc and recovering said 1-methyl-4-aminopiperazine therefrom.

14. Compounds of the group consisting of those having the general formula:

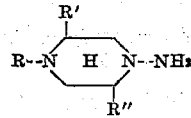

in which R is a member of the group consisting of lower alkyl, monocyclic aralkyl, dicyclic aralkyl, monocyclic aryl, di-lower alkylcarbamyl, pyridyl, pyrimidyl and thiazolyl radicals in which the bond from the nitrogen in the piperazine ring to the heterocyclic ring is to a

group and R' and R'' are members of the group consisting of hydrogen and methyl radicals and acid addition salts thereof.

15. A method of preparing compounds having the general formula:

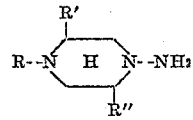

in which R is a member of the group consisting of lower alkyl, monocyclic aralkyl, dicyclic aralkyl, monocyclic aryl, di-lower alkylcarbamyl, pyridyl, pyrimidyl and thiazolyl radicals in which the bond from the nitrogen in the piperazine ring to the heterocyclic ring is to a

group and R' and R'' are members of the group consisting of hydrogen and methyl radicals which comprises reacting a compound having the formula:

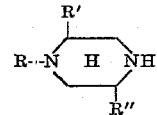

in which R, R' and R'' are as defined above with an alkali metal nitrite in a mineral acid to produce the corresponding 1-substituted-4-nitrosopiperazine, subsequently reducing said nitrosopiperazine and recovering said 4-aminopiperazine therefrom.

EDWARD A. CONROY.

No references cited.